Sept. 24, 1963 R. L. SWITZER ETAL 3,104,947
SUBMERGED COMBUSTION CONCENTRATION APPARATUS AND PROCESS
Filed Jan. 9, 1961 4 Sheets-Sheet 2

INVENTORS
ROBERT L. SWITZER
WILLIAM C. LIEFFERS
CLYDE H. O. BERG
BY
ATTORNEY

INVENTORS
ROBERT L. SWITZER
WILLIAM C. LIEFFERS
CLYDE H. O. BERG
BY
ATTORNEY

● 25.70 SQ. IN. ANNULUS AREA
× 17.55 SQ. IN. ANNULUS AREA

INVENTORS
ROBERT L. SWITZER
WILLIAM C. LIEFFERS
CLYDE H. O. BERG
BY

ATTORNEY

United States Patent Office 3,104,947
Patented Sept. 24, 1963

3,104,947
SUBMERGED COMBUSTION CONCENTRATION
APPARATUS AND PROCESS
Robert L. Switzer, Long Beach, William C. Lieffers, Garden Grove, and Clyde H. O. Berg, Long Beach, Calif., assignors, by mesne assignments, to Collier Carbon and Chemical Corporation, a corporation of California
Filed Jan. 9, 1961, Ser. No. 81,426
10 Claims. (Cl. 23—165)

This invention relates to a method and apparatus for submerged combustion heating of liquids and, in particular, relates to a method and apparatus for heating and concentrating phosphoric acid by submerged combustion.

This application is a continuation-in-part of our copending application, Serial No. 835,946, filed August 25, 1959, now Patent 3,073,683.

Phosphoric acid is an extremely troublesome liquid to heat. The acid is corrosive to most metals at ambient temperatures and corrosive to all presently known metals at elevated temperatures. Because of its corrosivity, metallic heat exchange surfaces are not suitable for indirect heating of the acid and it has been suggested that the acid be heated by direct contact with hot gases, e.g., by submerged combustion heating.

Previous attempts to heat and concentrate phosphoric acid on a commercial scale by submerged combustion have been troubled by the formation of aerosols, i.e., minute droplets, of phosphoric acid in the exhaust gases. These aerosols are extremely difficult to remove from the exhaust gases, yet because of their corrosivity and toxicity, they must be removed before the gases can be vented to the atmosphere, particularly when the device is used in a metropolitan area where any amount of aerosols in the exhaust gas can be objectionable. Because most methods of removing the aerosols, e.g., electrostatic precipitation, filtration, etc., do not provide for their recovery, or recover only a highly impure material, the aerosol formation represents a loss of valuable phosphoric acid and is objectionable for this reason.

The difficulty in heating phosphoric acid by submerged combustion is intensified when the acid is a "wet-process" type, i.e., one produced by leaching phosphate rock with sulfuric acid. Such wet-process phosphoric acid contains a high content of impurities composed of fluorine, silica, sulfur, aluminum, iron, magnesium, chromium, vanadium, copper, zinc, etc., as well as organic matter. When this acid is heated these impurities precipitate and form scale deposits on the heating equipment. Such scale deposits generally form on the apparatus near the point of mixing of the hot gases and the liquid, thereby disturbing the flow pattern in the heating apparatus and resulting in an increase in aerosol formation.

It is an object of this invention to avoid the formation of objectionable amounts of aerosols during the submerged combustion heating of liquids, particularly phosphoric acid.

It is also an object of this invention to avoid the formation of scale deposits on the heating apparatus.

We have discovered that the aforementioned objectives can be achieved by a sumberged combustion heating technique wherein hot combustion gases are discharged into a body of the acid and a combined gas and liquid acid stream is passed upwardly through a narrow annular zone surrounding said combustion gas stream. The combined stream is thereafter passed into a zone of enlarged cross-sectional area to disengage the entrained hot concentrated liquid acid from the gas stream containing the cooled combustion gases, water vapor and volatile impurities from the acid.

In accordance with our invention, the formation of aerosols in the exhaust gases is reduced to a minimum by: reducing the temperature of the combustion gases before they contact the acid; cooling the surfaces of said nozzle which are contacted with acid by passing a heat exchange fluid through the lower interior of the nozzle; and providing a very narrow annulus for the upward flow of the hot gases and acid surrounding the combustion gas stream.

Each of the aforementioned features of our invention will be described in detail, setting forth general relationships and limiting values when applicable, by reference to the figures of which:

Figure 1:
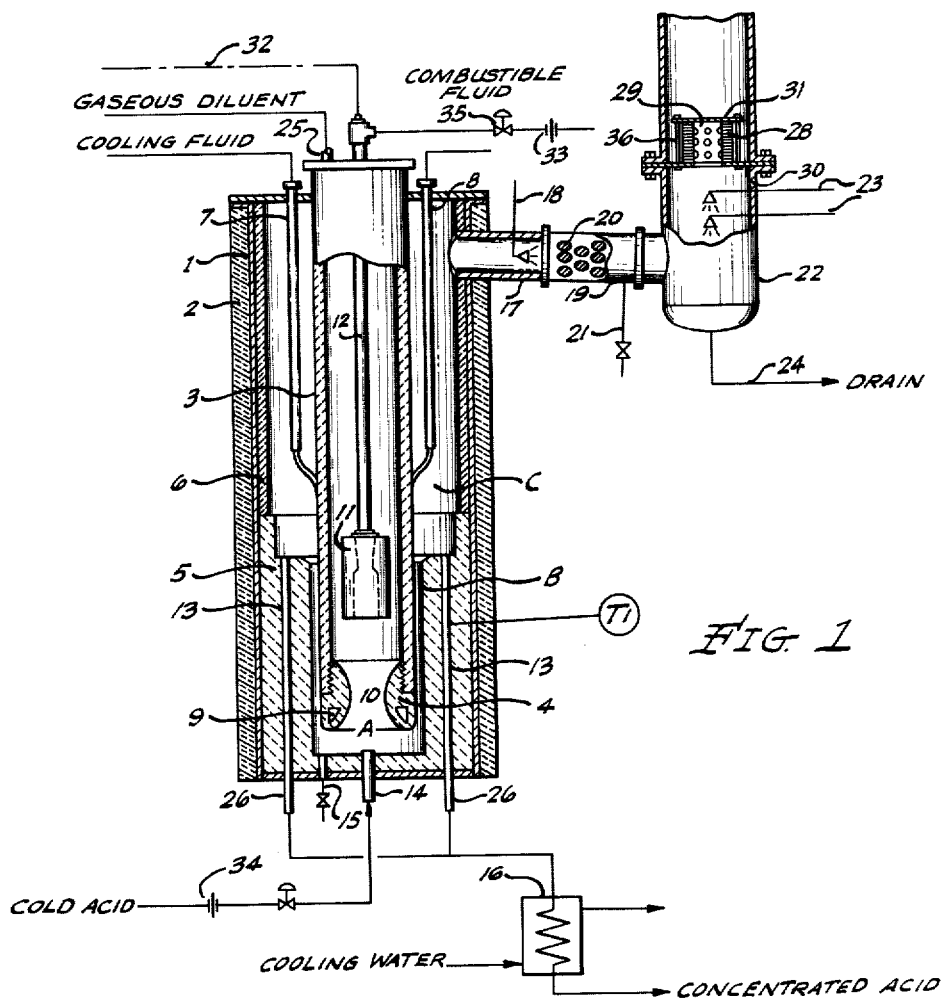
FIGURE 1 represents the submerged combustion heater of our invention.

Referring now to FIGURE 1, the heating vessel comprises a metal shell 1, which can be surrounded by a suitable thermal insulation 2 to reduce heat loss. Centrally disposed within shell 1 is a dip tube 3 with a nozzle 4 at its lower end. The lower end of dip tube 3 is concentrically disposed within a central bore of a crucible 5 to form zone A between the lower end of nozzle 4 and the crucible and to form annular zone B between the dip tube and the crucible. When employed to heat phosphoric acid, dip tube 4 and crucible 5 are constructed of any suitable corrosion resistant material, preferably graphite. The upper end of the metal shell is protected from corrosion by a graphite liner 6, although any other suitable corrosion resistant lining can be employed such as polyethylene; however, more thermally stable materials such as polytetrafluoroethylene ("Teflon"), polytrifluorochloroethylene ("Kel-F"), or epoxy resins are more suitable. Cooling fluid circulation lines 7 and 8 communicate with annular cooling chamber 9 in nozzle 4. A suitable gas or oil burner 11 of conventional construction, e.g., a tunnel type burner having a premixed air-fuel supply, such as manufactured by the North American Manufacturing Company, is positioned in a downward direction within the dip tube at the end of a combustible fluid supply line 12. Suitable fuel ignition means (not shown) are positioned in the burner, e.g., a spark plug or coil and actuated by ignition line 32 in the manner well known in the art. Although a single supply line 12 is shown, suitable for a pre-mixed supply of combustible fuel and oxidant, it is of course apparent that separate supply lines for each of these fluids could be provided and the mixing performed in burner 11, e.g., when an oil burner is employed at 11, the liquid oil fuel and air supply are separate. Diluent supply line 25 is provided for introduction of a cool inert diluent gas useful for temperature control. One or more liquid product withdrawal lines 26 are provided, extending through longitudinal bores 13 in crucible 5 to detrainment zone C. It is of course apparent that the withdrawal lines 26 and bores 13 need not extend in a longitudinal direction but can extend radially from chamber C. At the base of the crucible, directly beneath the longitudinal gas discharge passageway 10 of nozzle 4, is positioned the cold liquid feed line 14. If desired, the liquid feed can also be introduced into the top of crucible 5. Use of line 14, however, is preferred.

The exhaust gas is withdrawn from the upper end of entrainment separator C by line 17. Water spray means 18 can be provided within this conduit and an entrainment separator 19 can be used to coalesce the entrained liquid. It is preferred to employ water spray 18 only for cleaning purposes and not during normal operation of the plant so as to avoid dilution of the coalesced liquid recovered through line 21. The entrainment separator is shown to comprise a series of baffles 20 which are preferably placed in staggered relationship to provide a tortuous passageway for the gas stream. Preferably, to reduce the pressure drop through this section, the baffles are ichthyoidal in cross section. It is of course apparent that other conventional entrainment separators could be employed such as a series of fine mesh screens or other baffle means which will satisfactorily coalesce and remove the large size entrained liquid droplets. A drain line 21 is provided to remove the separated liquid. A second water spray section 23 is provided and an aerosol separator is also preferably employed. The aerosol separator as shown comprises a series of annular rings or discs 28 of a suitable woven fibrous material, e.g., felt or glass fibers, which are assembled on perforated cylinder 29 and compressed between flanges 30 and 31 by tie bolts 36. The upper end of screen 29 is sealed to gas flow by baffle plate 31 which directs the gas flow radially through the felt fibers. Baffle plate 30 seals the annular space from the stack beneath the discs.

When fresh water is supplied to sprays 23, a dilute, less than about 2–5 weight percent $P_2O_5$, acid solution is recovered via line 24. This material is sent to suitable waste disposal treatment. If desired, the effluent from line 24 can be recycled to the feed provided a dilute phosphoric acid is employed as the scrubbing liquid in sprays 23. This, however, necessitates use of corrosion resistant material for stack 22.

It is of course apparent that other separators such as electrostatic separators can also be used in lieu of section 27. Other useful separators are described in chapter 24 of Chemistry and Technology of Fertilizers by Sauchelli (1960).

When heating scale forming liquids, such as phosphoric acid, we have found that it is necessary to have a constriction on the dip tube discharge to prevent the liquid from surging into the dip tube where it forms a hard scale encrustation. Use of a sharp edge orifice, however, is not satisfactory because the resulting turbulence in zone A forms excessive amounts of aerosols. It is therefore necessary to employ a constriction or nozzle at the dip tube discharge which smoothly converges the gases and then gradually expands them into contact with the liquid without excessive turbulence.

Figure 2:
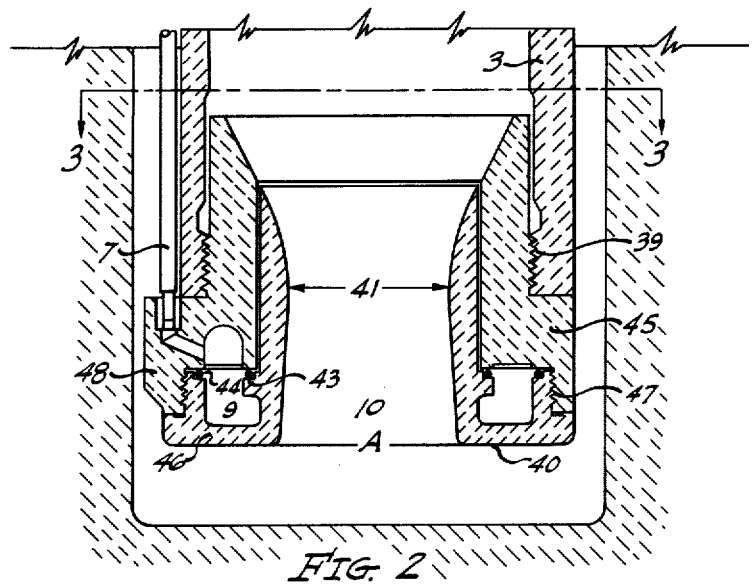
FIGURES 2 and 3 represent a first nozzle modification useful in the heater.

Referring now to FIGURE 2 there is illustrated one form of a nozzle having the desired performance. This nozzle comprises a sleeve 46 which is engaged into body 45 by threads 47. Body 45 is, in turn, attached to dip tube 3 by threads 39. Formed between sleeve 46 and body 45 is annular cooling chamber 9 sealed to the outside by sealing rings 43 and 44. Fluid circulation lines 7 and 8 are provided to supply a cooling fluid to chamber 9. As apparent from FIGURE 3, a shoulder 48 ies provided on the main body 45 to permit tapping an entrance hole for line 7. The outer surface of dip tube 3 can also be grooved as shown at 49 to provide a recess for lines 7 and 8.

In the assembly of sleeve 46 and body 45, a longitudinal gas passageway is formed having a throat 41 and a smoothly converging entrance and smoothly diverging exit passage. The surface of the entrance section is in the form of an inverted truncated cone which intersects the exit section, also having a surface of a truncated conical shape. To reduce turbulence in the gas stream, the sharp edge at the intersection of the entrance and exit sections is removed and a smooth transition into throat 41 is provided. A flat annular surface 40 is at the base of nozzle 4. The width of this surface depends on the throat diameter, the angle of divergence of the exit section and on the length of this section. Preferably this surface is reduced in area or completely eliminated by elongating the zone or by increasing the angle of divergence.

Figure 4:
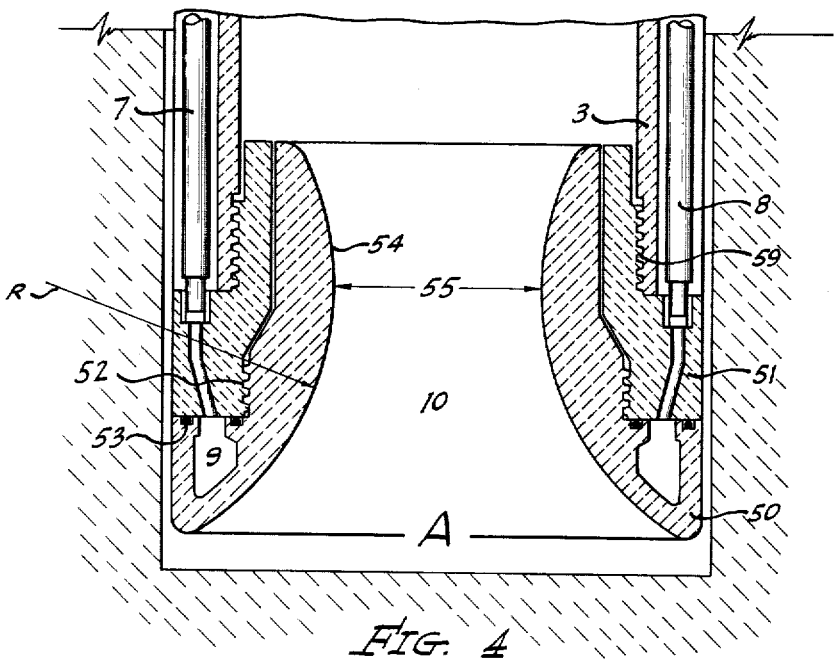
FIGURE 4 represents a second nozzle modification.

Referring now to FIGURE 4, a second nozzle embodiment is shown. As in the previous embodiment, a sleeve, 50, is fitted into a body 51 by threads 52. Body 51 is, in turn, fitted onto dip tube 3 with threads 59 and is provided with taps to receive cooling fluid circulation lines 7 and 8 which communicate with annular chamber 9, formed by assembly of 50 and 51. A sealing ring 53 is provided to seal chamber 9 from the interior of the nozzle. Longitudinal gas passageway 10 is formed within sleeve 50, the surface of which is defined by rotation of a circular arc 54 about the central axis to form a surface of revolution. Arc 54 is shown to have a radius of R which is the common radius of curvature for both the entrance and exit passages. Other similarly shaped nozzle surfaces can, of course, be employed such as those having surfaces of ellipsoids, paraboloids or hyperboloids of revolution.

Figure 3:
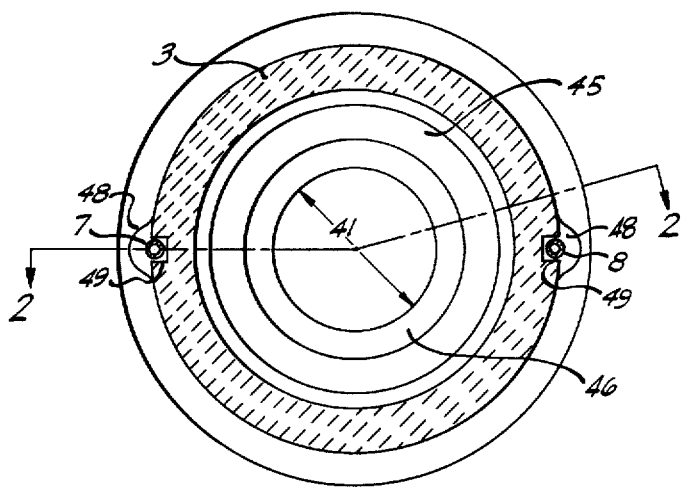

In operation of the heating apparatus, a fuel such as natural gas, producer gas, water gas, fuel oil, diesel oil, kerosine, etc. and an oxidant such as air, or oxygen are supplied to burner 11, ignited by a spark means through ignition wire 32 and the resultant hot combustion gases are directed downwardly through dip tube 3 and longitudinal passageway 10 in nozzle 4 determine the design firing rate of the burner. In general, we have found that minimum aerosol formation is achieved with firing rates between about 5000 to 75,000 B.t.u. per hour per inch of diameter of dip tube 3. The design firing rate for the nozzle configuration of FIGURES 2 and 3 is the minimum, from about 5,000 to 40,000 B.t.u. per hour per inch. The maximum design firing rates of between about 10,000 and 75,000 are achieved by nozzle embodiments of the type of FIGURE 4. Submerged combustion burners are available or can be fabricated in an almost unlimited range of heat release capacities, e.g., from a few thousand to ten million or more B.t.u. per hour. However, because of the limited availability and cost of cylindrical graphite stock of diameters greater than about 6 feet to fabricate crucible 5 and dip tube 3, we prefer that the maximum firing rate be no greater than about five million B.t.u. per hour. For plants having a greater design capacity, it is preferred to employ two or more burner assemblies with separate or common disengaging zones, C. The design firing rates for the burners are those rates which produce the minimum quantities of aerosols in the exhaust gases; it is, of course, apparent that the maximum capacity of the apparatus can be several times greater than the design basis if there is no desire or need to minimize the aerosol formation.

Figure 5:
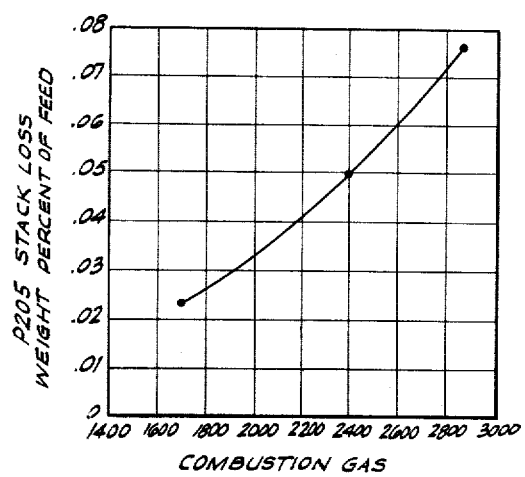
FIGURE 5 illustrates the effect of gas temperature on aerosol losses.

As previously mentioned one of the features of our invention is in reducing the temperature of the combustion gases for we have found that the temperature of the combustion gases preferably should be about 1400° to 2500° F. to prevent the formation of excessive amounts of phosphoric acid aerosols in the stack gases. The effect of the combustion gas temperature on aerosol losses from the heater is shown by FIGURE 5 wherein the loss of phosphorus as aerosols is expressed in weight percent of the feed and plotted against the combustion gas temperature. FIGURE 5 shows that the lowest combustion temperature provides the lowest aerosol losses; for efficient plant operation and to avoid excessive gas loading in the system, we prefer that the temperature be between about 1000° F. and about 2000° F. The temperature of these gases can be regulated by any suitable means, e.g., by introduction of a cool diluent gas such as air, nitrogen or recycled stack gases through line 25. Preferably, natural gas having a heating value of about 1000 B.t.u. per cubic foot is premixed with air, supplied to the burner, ignited and the hot combustion gases are diluted to obtain a temperature of about 1600° F. by supply of air in the amount of about 50 to 150 percent of that required for combustion through line 25. The cooled gases are directed downwardly through passageway 10 into contact with the dilute phosphoric acid feed.

The dilute phosphoric acid can be a relatively dilute material such as produced in the wet acid process and having about 20 to 35 weight percent phosphorus expressed as $P_2O_5$. Preferably, however, this acid has been partially concentrated to about 35 to 55 weight percent phosphorus as $P_2O_5$. Although submerged combustion heaters have been employed at subatmospheric pressures to concentrate dilute phosphoric acid to a $P_2O_5$ content of about 55 weight percent, heretofore no commercial application has been made of submerged combustion heating to obtain a more highly concentrated acid or to operate at atmospheric pressures. The submerged combustion heater of our invention is particularly suited to produce a highly concentrated phosphoric acid with a $P_2O_5$ content between about 67 and 80 weight percent. Advantageously, the heater can be operated at atmospheric pressures, eliminating the condensers and vacuum systems commonly employed. The acid feed preferably is directed into the bottom of crucible 5 and contacts the hot gases issuing from nozzle 4. As previously mentioned, the dilute acid can also be introduced into zone C and permitted to drain down annular zone B into contact with the hot gases; however, this is not the preferred method since it results in a higher temperature in zone A which, in turn, increases the aerosol formation.

The acid feed introduced into zone A is prevented from passing into dip tube 3 by the high velocity of the hot gases through the constriction in nozzle 10. We have found that in the absence of a constriction on the lower end of dip tube 3, the acid enters this tube and forms hard solid deposits on the hot burner surface and the interior dip tube walls. Absence of a constriction also permits the acid to surge in the dip tube during upset conditions sufficiently to extinguish the flame in burner 11. Accordingly it is necessary to constrict the lower end of dip tube 3.

We have found that the amount of aerosols formed in the exhaust gases can be reduced by minimizing the turbulence in zone A which is created by expansion of the gas stream, mixing of the gas with the acid feed and by reversal of the flow of the gas and acid stream upwardly into annulus B. The degree of turbulence is minimized in accordance with my invention by use of the aforedescribed nozzles having smoothly converging entrance sections and smoothly diverging exit sections which are of a truncated conical shape, or have surfaces defined by the revolution of a circular, hyperbolic, parabolic or elliptical arc about the nozzle's longitudinal axis.

To prevent solid deposits from forming on the exit surfaces of the nozzle passageway 10 and thereby disturbing the flow conditions and forming excessive amounts of aerosols, we have found it necessary to cool the lower portion of the nozzle. Suitably this is accomplished by passing a heat exchange fluid through chamber 9 in a sufficient amount to remove between about 0.5 and about 50 percent of the heat input from the burner.

The combined hot gas and dilute acid stream from zone A is directed into and flows upwardly through narrow annulus B where it contacts some of the hot acid recirculating from zone C. The depth of zone B has not been found to be critical and can be varied from several inches to several feet. The width of annulus zone B, however, has been found to have a surprising and unusual effect on the extent of aerosols in the stack gases.

We have found that, contrary to the conditions observed in zone A where high turbulence results in large amounts of aerosols, the opposite condition prevails in zone B where the wider this zone (hence, the less the turbulence), the greater are the amounts of aerosols in the stack gases. In general, we have found that the width of zone B is independent of the diameter of dip tube 3 and should be between about 0.1 and about 1.5 inches, preferably between about 0.1 and about 0.75 inch to attain minimum aerosol formation. In addition to its beneficial reduction in aerosol formation, the turbulence in zone B scours the outside surface of the dip tube and prevents solid deposits from forming on this surface.

Figure 6:
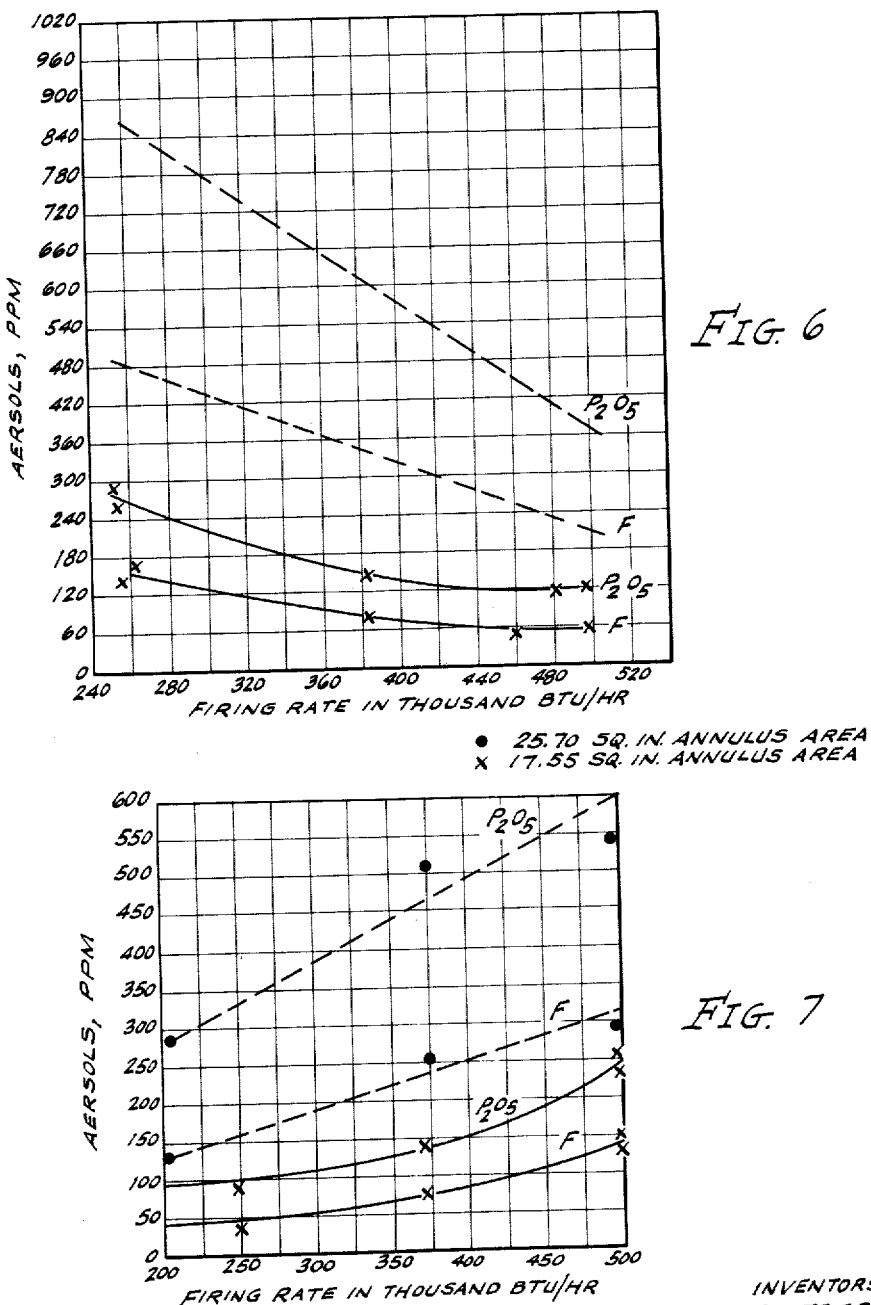
FIGURE 6 is a performance curve of the second nozzle modification of FIGURE 4.
Figure 7:
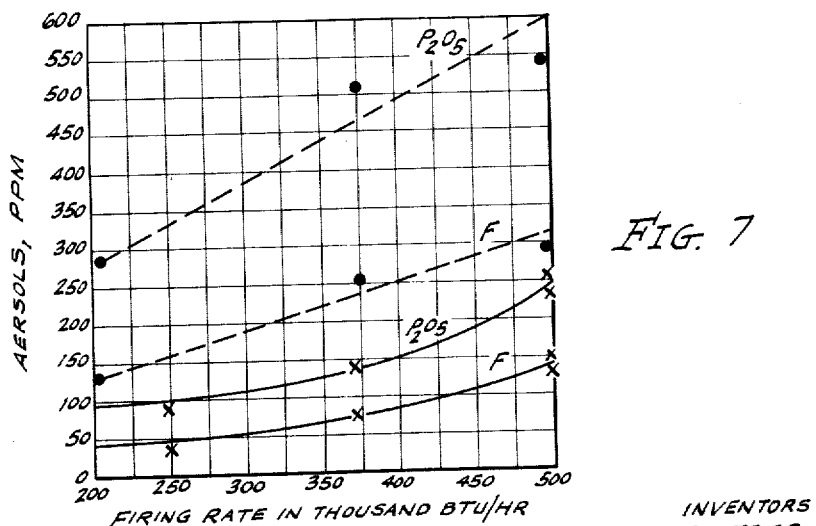
FIGURE 7 is a performance curve of the first nozzle modification of FIGURE 2.

The effect of annulus width on the amount of aerosols formed in the stack gases is shown in FIGURES 6 and 7 which represent aerosol losses in parts per million as a function of the net mass flow through the annulus as expressed in firing rate in thousand B.t.u. per hour. FIGURE 7 presents the performance of the nozzle of FIGURES 2 and 3 and FIGURE 6 presents the performance of the nozzle shown in FIGURE 4. From FIGURES 6 and 7 it can be seen that at any firing rate (constant mass flow) increasing the annulus width increases the aerosol losses.

FIGURE 6 also shows that within the range of firing rates investigated, the nozzle of FIGURE 4 shows decreasing aerosol formation with increase in firing rate. Accordingly, this nozzle is preferred to that of FIGURES 2 and 3 where the aerosol formation increases with firing rate.

The heating plant of our invention can be controlled with little difficulty. In general, the burner firing rate, acid feed rate and concentration of the acid product are interdependent; the control of any two determines the third. The temperature of the acid in annular zone B can suitably be employed as an indication of the product's concentration, thereby permitting a continuous indication of this variable. To measure the temperature, a thermowell is placed in the annulus and coated with a suitable corrosion resistant material, e.g., "Teflon." A thermocouple is inserted in the thermowell and connected to suitable indicating means indicated by T1 on FIGURE 1. The burner firing rate can be suitably measured by flow measuring means 33 in FIGURE 1, such as orifice meters, volume displacement meters, etc., in the fuel line. Similarly, flow measuring means, 34, e.g., orifice meters, venturi meters, can be placed in the acid feed line.

In use, it will generally be desired to produce an acid product having a predetermined concentration, which, in turn, determines the temperature in annulus B. This temperature can be set to automatically control one of the remaining variables, i.e., either firing rate or acid feed rate, while the remaining variable is adjustable for the desired capacity. Preferably, the annulus temperature is set to automatically control the acid feed rate and the firing rate is adjustable to permit the operator to set the plant at the capacity which provides the minimum aerosol loss.

The following examples will illustrate the construction and use of our invention:

*Example 1*

A submerged combustion heating vessel as depicted in FIGURE 1 was employed to heat and concentrate "wet-process" phosphoric acid at atmospheric pressure. The apparatus had a dip tube diameter of 12.78 inches, the central bore in the crucible 5 was 14.75 inches in diameter, and a liner was placed in the bore to reduce its diameter to 13.63 inches and provide annular zone B with a width of 0.42 inch. A nozzle having the shape shown in FIGURE 4 with a throat diameter of 5.09 inches was employed. The dip tube was installed with a clearance of 1½ inches between the lower end of the nozzle and the bottom of the crucible.

Dilute "wet-process" phosphoric acid having a phosphorus content of 53.3 weight percent as $P_2O_5$, 0.7 weight percent fluorine and 7.7 weight percent impurities was supplied to the heater via line 14 and concentrated acid was withdrawn from chamber C via lines 26 and cooled in 16. The product acid had a phosphorus content of 66.1 weight percent (as $P_2O_5$) and 8.5 percent impurities.

Water spray 23 was employed to scrub out impurities in the exhaust gases and the exhaust gas was periodically sampled after the water sprays but prior to separator 27 and also after it had passed through the final mist separator 27.

The burner was fired at 498,000 B.t.u. per hour and 100 percent excess air was supplied via line 25. The dilute acid feed rate was 602 pounds per hour as controlled by a temperature controller set to maintain the acid's temperature in the annulus at about 430° F. Cooling water was circulated through zone 9 at a rate sufficient to prevent the formation of deposits on the nozzle surface, about 25 pounds per minute. Approximately 72,000 B.t.u. per hour were removed by this cooling. The analysis of the gas samples at the inlet to separator 27 indicated that they contained 118 parts per million of phosphorus (as $P_2O_5$) and 59 parts per million of fluorine. The gas samples taken after separator 27 had only 7 parts per million of phosphorus (as $P_2O_5$) and 3 parts per million of fluorine. The amount of phosphorus which is recovered in a dilute solution from line 24 was about 0.4 percent of the total phosphorus in the feed.

*Example 2*

The run was repeated at a lower firing rate, 250,000 B.t.u. per hour and the dilute acid feed rate to maintain the annulus temperature at 430° F. was 208 pounds per hour. The acid product had a phosphorus content of 66.8 weight percent (as $P_2O_5$). All other conditions were substantially the same as Example 2. The gas sample before separator 27 had 292 parts per million of phosphorus (as $P_2O_5$) and 167 parts per million of fluorine. After the separator, the exhaust gas contained 18 parts per million phosphorus (as $P_2O_5$) and 6 parts per million of fluorine. About 0.2 percent of the phosphorus in the feed acid was lost through line 24.

*Example 3*

The line within the bore of crucible 5 was replaced with one having a diameter of 14.0 inches for an annulus width of 0.61 inch. The remainder of the apparatus was the same as employed in Examples 1 and 2.

A "wet-process" phosphoric acid having a phosphorus content of 51.0 weight percent (as $P_2O_5$) and an impurities content of 6 weight percent was concentrated to 70.5 weight percent phosphorus (as $P_2O_5$). At a firing rate of 250,000 B.t.u. per hour, the phosphorus content of the exhaust gases before separator 27 was 585 parts per million and the fluorine content was 375 parts per million. At a firing rate of 500,000 B.t.u. per hour, the phosphorus content (as $P_2O_5$) of the exhaust gas before separator 27 was 270 parts per million and the fluorine content was 160 parts per million.

In all the examples cooling water was supplied to annular chamber 9 in an amount sufficient to prevent solid depositions on the nozzle. When no cooling water is supplied, hard deposits rapidly form on the nozzle and cause excessive amounts of aerosols in the stack gases. These aerosols form a dense white plume in the gases.

The preceding examples are solely for description of the invention and are not to be construed as unduly limiting of the invention. Although the invention has been described with reference to heating phosphoric acid, it is of course apparent that it is applicable to the heating of any liquid, particularly those liquids which tend to deposit solids and form aerosols during the heating operation, e.g., sulfuric acid, aqueous salt solutions, slurries, etc. Our invention comprises the features or their obvious equivalents which are set forth in the following claims.

We claim:

1. In the process of concentrating phosphoric acid wherein a stream of combustion gases generated by the oxidation of a fuel are passed into direct contact with a liquid body of said acid to heat said acid and expel water vapor and volatile impurities therefrom, the improved method of minimizing the loss of phosphorus to the exhaust gases from said process which comprises adjusting the temperature of said combustion gases to a temperature between about 1000° and 2000° F. prior to their contacting said acid.

2. The improved process of claim 1 wherein said temperature of said combustion gases is regulated to about 1200° to 2000° F. by the addition thereto of air in the amount between about 50 to 150 percent of that required for said oxidation of said fuel.

3. In the concentration of phosphoric acid by submerged combustion heating of said phosphoric acid wherein hot combustion gases are generated in a burner and passed into contact with said acid in a contacting zone remote from said burner, the improved method of preventing deposits from forming on said heating apparatus while maintaining a low aerosol formation in exhaust gases from said heating which comprises:

passing said combustion gases as a confined stream downwardly from said burner and at a point remote from said burner constricting the cross-sectional area of said stream and thereafter expanding said stream into contact with said acid;

reducing the temperature of said stream of hot combustion gases to a temperature between about 1000° and 2000° F. prior to contact with said acid;

introducing said phosphoric acid into said contact zone to admix with said combustion gases;

passing the admixture so obtained upwardly as an annular confined stream having a width between about 0.1 and 1.5 inches, said stream surrounding and in indirect heat exchange with said downwardly flowing stream of hot combustion gases;

expanding said annular stream to separate entrained liquid from an exhaust gas, recovering said entrained liquid; and controlling the heat release of said burner to between about 5000 and about 75,000 B.t.u. per hour per inch of diameter of said confined stream of hot combustion gases.

4. The method of claim 3 wherein said exhaust gas is passed through a tortuous passageway to coalesce and remove entrained liquid acid.

5. The method of claim 3 wherein said exhaust gas is passed through a tortuous passageway to coalesce and remove entrained liquid and thereafter is contacted with a water spray and passed through a porous filter.

6. In the method of claim 3 wherein said confined stream of hot combustion gases are passed through a nozzle and expanded into contact with said acid through the divergent exit surfaces of said nozzle, the improvement which comprises cooling said divergent exit surfaces by circulating a heat exchange liquid through an annular passageway interior of said nozzle.

7. A submerged combustion heater comprising a burner, fuel and oxidant supply lines to said burner, means to initiate combustion in said burner, a first cylindrical conduit surrounding said burner, closed at its upper end and having a constricted lower end positioned a substantial distance beneath said burner, a vessel having in its lower extremity an interior cylindrical wall concentrically surrounding said first conduit, said wall being impermeable to fluids and having an inside diameter between about 0.2 and 3.0 inches greater than the outside diameter of said first conduit to form a first annular zone therebetween, said vessel having a closed lower end beneath said constricted lower end of said first conduit and having in its upper extremity an interior wall of substantially greater internal diameter than said outside diameter of said first conduit so as to form therebetween a second annular zone of substantially greater cross-sectional area than said first annular zone, means to supply a liquid into said vessel, means to withdraw a fluid from the lower portion of said second annular zone of said vessel and means to withdraw exhaust gases from the upper region of said second annular zone.

8. The apparatus of claim 7 wherein baffle means are provided in said vapor withdrawal means to deflect the vapor flow therethrough and coalesce entrained liquid.

9. The apparatus of claim 7 wherein said constricted lower end of said first cylindrical conduit comprises a nozzle having a constricted throat and a smoothly divergent exit passageway.

10. The apparatus of claim 9 wherein said nozzle has an interior annular chamber surrounding said constricted passageway and means to circulate a liquid into and through said chamber.

References Cited in the file of this patent

UNITED STATES PATENTS

| | | |
|---|---|---|
| 1,012,523 | Corne | Dec. 19, 1911 |
| 1,258,562 | Harris | Mar. 5, 1918 |
| 1,689,551 | Hammond | Oct. 30, 1928 |
| 1,732,805 | Yarmett | Oct. 22, 1929 |
| 2,506,853 | Berg et al. | May 9, 1950 |
| 2,551,569 | Strelzoff | May 1, 1951 |
| 2,579,203 | Putney | Dec. 18, 1951 |
| 2,772,729 | Mayhew | Dec. 4, 1956 |
| 2,828,956 | Bienjosek et al. | Apr. 1, 1958 |
| 2,830,769 | Work | Apr. 15, 1958 |
| 2,849,860 | Lowe | Sept. 2, 1958 |

FOREIGN PATENTS

| | | |
|---|---|---|
| 759,062 | Great Britain | Oct. 10, 1956 |

OTHER REFERENCES

"Submerged Combustion Flares Anew" Chemical. Engg: February 1956, pages 163–169. Only page, 167, needed.

Disclaimer 3,104,947.—*Robert L. Switzer*, Long Beach, *William C. Lieffers*, Garden Grove, and *Clyde H. O. Berg*, Long Beach, Calif. SUBMERGED COMBUSTION CONCENTRATION APPARATUS AND PROCESS. Patent dated Sept. 24, 1963. Disclaimer filed Jan. 11, 1966, by the inventors; the assignee, *Union Oil Company of California*, consenting.

Hereby enter this disclaimer to claims 1 and 2 of said patent.
[*Official Gazette April 19, 1966.*]